(12) United States Patent
Iwano (10) Patent No.: US 8,302,025 B2
(45) Date of Patent: Oct. 30, 2012

(54) MAP DISPLAY DEVICE (75) Inventor: Katsumi Iwano, Yokohama (JP)

(73) Assignee: Clarion Co., Ltd.

(*) Notice: Subject to any disclaimer, the term of this patent is extended or adjusted under 35 U.S.C. 154(b) by 211 days.

(21) Appl. No.: 12/671,307

(22) PCT Filed: Jul. 31, 2007

(86) PCT No.: PCT/JP2007/064992
§ 371 (c)(1),
(2), (4) Date: Jan. 29, 2010

(87) PCT Pub. No.: WO2009/016737
PCT Pub. Date: Feb. 5, 2009

(65) Prior Publication Data
US 2010/0192088 A1 Jul. 29, 2010

(51) Int. Cl.
G06F 3/048 (2006.01)

(52) U.S. Cl. ......... 715/784; 715/790; 715/801; 715/858

(58) Field of Classification Search .................. 715/784, 715/790, 801, 858
See application file for complete search history.

(56) References Cited

U.S. PATENT DOCUMENTS

| 5,966,135 | A * | 10/1999 | Roy et al. ...................... 345/619 |
| 6,199,015 | B1 * | 3/2001 | Curtwright et al. ........... 701/213 |
| 6,314,370 | B1 * | 11/2001 | Curtright ...................... 701/213 |
| 2002/0065691 | A1 * | 5/2002 | Twig et al. ....................... 705/7 |
| 2002/0067288 | A1 | 6/2002 | Wakamatsu et al. |
| 2002/0078300 | A1 * | 6/2002 | Dharap .......................... 711/133 |
| 2003/0151591 | A1 * | 8/2003 | Harpen et al. ................. 345/156 |
| 2004/0198389 | A1 * | 10/2004 | Alcock et al. .............. 455/456.1 |
| 2005/0090974 | A1 | 4/2005 | Hirose |

FOREIGN PATENT DOCUMENTS

| JP | 10307042 A | 11/1998 |
| JP | 11002539 A | 1/1999 |
| JP | 2002-168632 A | 6/2002 |
| JP | 2003-121172 A | 4/2003 |
| JP | 2005-134429 A | 5/2005 |

OTHER PUBLICATIONS

International Search Report dated Sep. 18, 2007 (One (1) page).
Japanese Office Action dated Aug. 14, 2012 with English Translation (7 pages).

* cited by examiner

Primary Examiner — Weilun Lo
Assistant Examiner — Rashedul Hassan
(74) Attorney, Agent, or Firm — Crowell & Moring LLP (57) ABSTRACT Weather information is acquired and stored from a satellite radio broadcast. On the basis of this weather information, weather information image data is created for displaying the weather information superimposed upon a map. When the weather information display map is scrolled, the range of the map data shifts. Together therewith, the range of the weather information image data also shifts. After a map has been drawn on the basis of the map data for the shifted range, icons or the like that describe the weather information are drawn as superimposed upon this map on the basis of the weather information image data for the shifted range. Then the image data stored in the image memory is read in, and the weather information display map that has been drawn is display upon the display monitor.

7 Claims, 12 Drawing Sheets

MAP DISPLAY DEVICE

TECHNICAL FIELD

The present invention relates to a map display device that displays certain icons overlaid upon a map.

BACKGROUND ART

A prior art technique is per se known in which a map display device stores weather information acquired from an external weather information center in a working memory, extracts this weather information stored in the working memory, and displays this weather information upon a display monitor along with a map (for example, refer to Patent Document #1).
Patent Document #1: Japanese Laid-Open Patent Publication 2003-121172.

DISCLOSURE OF THE INVENTION

Problems to be Solved by the Invention

With a prior art map display device as described in Patent Document #1, when the map is scrolled, the weather information to be displayed also changes. Due to this, each time the map is scrolled, the weather information stored in the working memory is extracted, image data for displaying this extracted weather information is generated, and the weather information is thus displayed upon the display monitor. Accordingly there is a fear that it will not be possible for the display of the weather information to follow the scrolling of the map, in which case the weather information may not be properly displayed upon the display monitor.

Means for Solving the Problems

The map display device according to the present invention comprises: a map display control unit that displays a map upon a display monitor; a map scroll unit that scrolls the map; a weather information reception unit that receives weather information; and a weather information display control unit that displays the weather information as overlaid upon the map; wherein the weather information display control unit displays the weather information as overlaid upon the map after scrolling, using weather information image data created before the map is scrolled, on the basis of the weather information. This map display device comprises: a map image data storage unit that stores map image data drawn on the basis of the map data; and a weather information image data storage unit that stores the weather information image data; wherein the weather information display control unit reads in weather information image data corresponding to the display range of the map displayed upon the display monitor by synchronizing timing of reading in map image data stored in the map image data storage unit and timing of reading in weather information image data stored in the weather information image data storage unit, and displays weather information as overlaid upon the map by using this weather information image data that has been read in. And it is preferred that the weather information image data is image data that was used for displaying weather information upon the map before scrolling. The map display control unit displays the map with display modes for regions in which weather information according to the weather information image data is displayed and for regions in which no such weather information is displayed being changed in each other.

In the above described map display device, the weather information display control unit: displays weather information over the map after scrolling using weather information image data created on the basis of the weather information before the map is scrolled, if the scale of the map being displayed on the display monitor is less than a predetermined value; and displays weather information over the map after scrolling using weather information image data created on the basis of the weather information after the map is scrolled, if the scale of the map being displayed on the display monitor is greater than or equal to the predetermined value.

The weather information display control unit of the map display device according to the present invention may change the classes of weather information that are displayed as overlaid upon the map displayed upon the display monitor, on the basis of the scale of the map.

The map display control unit of the map display device according to the present invention may: display no place names upon the map displayed upon the display monitor if the scale of the map is less than a predetermined value, and display place names upon the map displayed upon the display monitor if the scale of the map is greater than or equal to the predetermined value.

Advantageous Effect of the Invention

According to the present invention, it is arranged to create weather information image data for displaying the weather information before the map is scrolled, so that, when the map has been scrolled, it is possible to display the weather information as superimposed over the map by using this weather information image data. Accordingly it is possible to display the weather information rapidly when the map is being scrolled, or after the map has been scrolled, since it is not necessary to extract weather information stored in the working memory and to create image data for displaying this extracted weather information each time the map is scrolled.

BEST MODE FOR CARRYING OUT THE INVENTION

Figure 1:
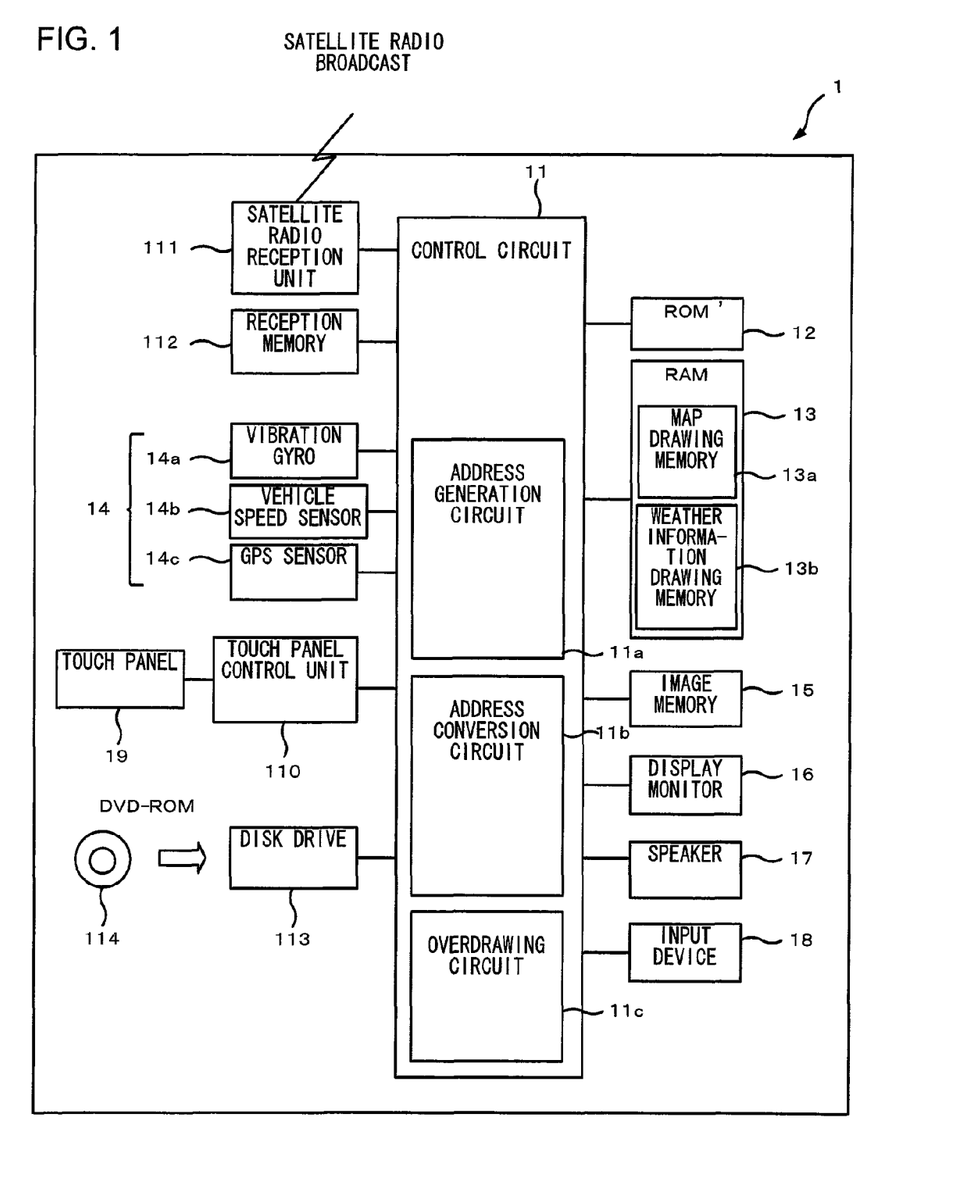
FIG. 1 is a block diagram showing the structure of a navigation device according to an embodiment of the present invention.

FIG. 1 shows a navigation device 1 according to an embodiment of the present invention. This navigation device 1 is able to receive weather information from a satellite radio broadcast and to display this weather information upon a display monitor 16 as overlaid upon a map. This per se known satellite radio broadcast may, for example, be the Sirius satellite radio or the like. The navigation device 1 includes a control circuit 11, a ROM 12, a RAM 13, a current position detection device 14, an image memory 15, a display monitor 16, a speaker 17, an input device 18, a touch panel 19, a touch panel control unit 110, a satellite radio reception unit 111, a reception memory 112, and a disk drive 113. A DVD-ROM 114 upon which map data is stored is loaded into the disk drive 113.

The control circuit 11 includes a microprocessor and its peripheral circuitry, and performs various types of control by executing a control program stored in the ROM 12, using the RAM 13 as a working area. When this control circuit 11 has performed certain route search processing on the basis of the map data stored upon the DVD-ROM 114, the result of this processing is displayed upon the display monitor 16 as a recommended route. The control circuit 11 includes an address generation circuit 11a, an address conversion circuit 11b, and an overdrawing circuit 11c. This address generation circuit 11a, address conversion circuit 11b, and overdrawing circuit 11c will be described hereinafter.

The RAM 13 includes a map drawing memory 13a and a weather information drawing memory 13b. A map for display upon the display monitor 16 is drawn in the map drawing memory 13 on the basis of the map data. And weather information for display upon the display monitor 16 is drawn in the weather information drawing memory 13b on the basis of the weather information stored in a reception memory that will be described hereinafter.

The current position detection device 14 is a device that detects the current position of a vehicle. This current position detection device 14 includes a vibration gyro 14a, a vehicle speed sensor 14b, a GPS (Global Positioning System) sensor 14c, and so on. The vibration gyro 14a detects the direction in which the vehicle is being driven. The vehicle speed sensor 14b detects the vehicle speed. And the GPS sensor 14c detects the GPS signals from the GPS satellites. The navigation device 1 determines a display range for the map, a start point for route searching, and so on, on the basis of the current position of the vehicle as detected by this current position detection device 14. And the current position of the vehicle is displayed upon the map as a subject vehicle position mark.

The image memory 15 stores image data for display upon the display monitor 16. This image data includes data for road map drawing and drawing data of various other types. This data is created by the control circuit 11 as appropriate, on the basis of the map data stored upon the DVD-ROM 114 and so on. By using the image data created in this manner, the navigation device 1 is able to perform map display and so on.

The disk drive 113 reads out map data from the DVD-ROM 114. This map data includes data for map display, data for route searching, and so on. The data for map display and the data for route searching include link information and node information for roads stored in the map data. In this embodiment, the data for map display includes map data at seven stages of magnification, from wide area to detailed. Due to this, it is possible to change the scale of the displayed map in seven stages, in response to requests from the user. It should be understood that it would also be acceptable to arrange to read out the map data from some type of recording medium other than the DVD-ROM 114, for example from a CD-ROM or a hard disk or the like.

On the basis of the various types of information such as map data and so on, the display monitor 16 supplies various types of information to the user as a screen display, such as a map of the vicinity of the position of the subject vehicle and so on. The speaker 17 outputs audio for ordering the user to perform various types of input operation, and for route guidance and so on. The input device 18 includes actuation keys for the user to issue commands of various types, and is implemented as button switches upon an operation panel or hardware switches around the panel or the like. The actuation keys are included for the user to issue commands of various types; those keys are implemented as button switches upon the operation panel or hardware switches around the panel or the like. Moreover, by operating this input device 18, it is possible for the user to change the scale of the map being displayed upon the display monitor 16, and to scroll the map and so on. For example, the scale of the 1/50,000 map is 1 to 50,000. A destination may be set by the user manually operating the input device 18 according to commands upon the display screen of the display monitor 16, or according to audio commands from the speaker 17. Moreover, by operating the input device 18, it is possible to tune into a satellite radio broadcast.

When a destination has been set by the user, the navigation device 1 takes the current position detected by the current position detection device 14 as a departure point, and performs calculation of a route to that destination on the basis of some predetermined algorithm. The route that has been obtained in this manner (hereinafter termed the "recommended route") is shown upon the screen by changing some element of its display format, for example its display color or the like, so as to distinguish it from other roads. Due to this, it is possible for the user to recognize the recommended route upon the screen. Moreover, the navigation device 1 performs route guidance for the vehicle by issuing driving direction commands to the user via the screen or via audio or the like, so that he is able to drive the vehicle along the recommended route.

The touch panel 19 is a transparent touch switch that is laminated to the front surface of the display monitor 15. The image that is displayed upon the display monitor 16 is thus displayed through this touch panel 19. Accordingly, when the display screen of the display monitor 16 is pressed, the touch panel 19 is also pressed. And the touch panel 19 sends a signal to the touch panel control unit 110, corresponding to the position of this pressing operation upon the touch panel 19. The touch panel control unit 110 then calculates the position upon the touch panel 19 at which it has been pressed.

When the user presses any one of several buttons or a field of a menu displayed upon the display monitor 16 with his finger or the like, then the touch panel 19 is pressed and outputs a touch signal. And processing is executed as defined by that button or by that field of the displayed menu.

The satellite radio reception unit 111 receives a satellite radio broadcast that is broadcast via an artificial satellite from a satellite radio station not shown in the figures, and outputs that broadcast to the control circuit 11. This satellite radio broadcast that has been received is outputted by the speaker 17. Moreover, the weather information in the satellite radio broadcast that has been received by the satellite radio reception unit 111 is stored in the reception memory 112 as a weather table.

This weather information in the satellite radio broadcast may include information for weather maps, information about storms such as typhoons and hurricanes and so on, information from weather radar related to amounts and distribution of rainfall, information about wind direction and wind strength at various observational locations, and so on. The information for weather maps may include, for example, information about the positions of high pressure areas and/or low pressure areas (i.e. their latitudes and longitudes), information about the positions of warm fronts and/or cold fronts, information about isobars, information about barometric pressure, and so on. The information about storms may include, for example, information about the observed positions of one or more regions in which typhoons, hurricanes, whirlwinds, hail, hailstorms, thunderstorms and so on are occurring, and about their predicted paths (shift directions) and so on. And the information about the amounts and distribution of rainfall may include, for example, information about the observed positions where rain is falling and the amounts of rainfall at those positions and so on.

Figure 2:
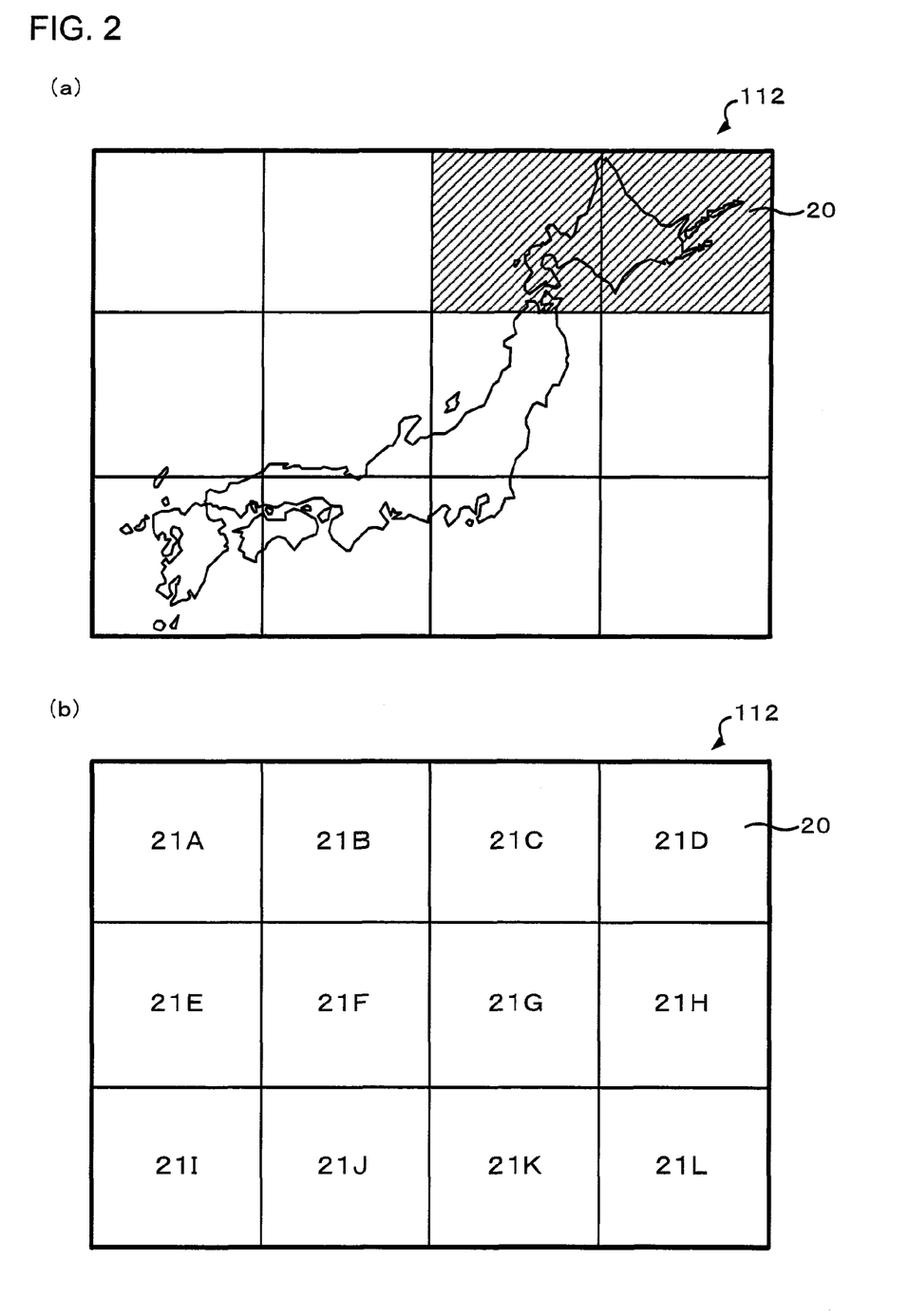
FIG. 2 is a figure for explanation of weather information that is transmitted area by area.

Weather information for all of a specified country, or weather information for all regions of Europe or the like, is not transmitted all together in the weather information in a satellite radio broadcast, but rather is transmitted separately for each of certain predetermined areas. For example in the case of Japan, as shown in FIG. 2, the weather information for the Honshu and vicinity regions may be transmitted separately for each of twelve areas 21A through 21L.

The reception memory 112 is a rewritable non-volatile recording medium such as a flash memory or a hard disk or the like. This reception memory 112 stores the weather information for each of the areas 21A through 21L that has been received by the satellite radio reception unit 110. This weather information stored in the reception memory 112 is displayed upon the map as icons, isobars, cold fronts and so on.

Figure 3:
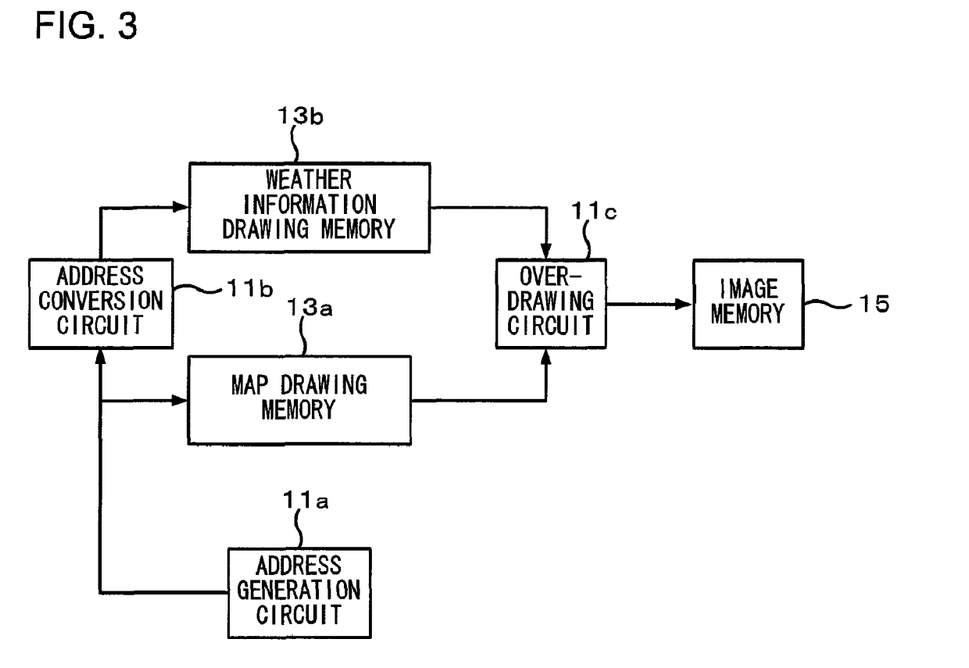
FIG. 3 is a figure for explanation of a circuit for drawing a weather information display map.

Next, the process of creating map image data in which weather information is displayed will be explained with reference to FIG. 3. The control circuit 11 creates map image data on the basis of the map data corresponding to the display range of the display monitor 16, and stores this map image data in the map drawing memory 13a. Moreover, the control circuit 11 creates weather information image data on the basis of the weather information stored in the reception memory 112 and the scale of the map being displayed, and stores this weather information image data that it has created in the weather information drawing memory 13b.

The overdrawing circuit 11c then creates image data for a map in which the weather information is displayed by overdrawing the image of the weather information image data outputted from the weather information drawing memory 13b upon the image of the map image data outputted from the map drawing memory 13a. At this time, the timing at which the map image data is read out and the timing at which the weather information image data is read out are synchronized by the address generation circuit 11a, in order to ensure that weather information image data is read out that corresponds to the display range for the map image data that is outputted. The addresses in the memories 13a and 13b for the map image data and the weather information image data corresponding to the position (i.e. the latitude and longitude) of this map image data upon the map are not limited to being the same. Thus, when the map image data is read out, weather information image data at an address that has been converted by the address conversion circuit 11b is read out from the weather information drawing memory 13b, in order to ensure that weather information image data corresponding to this map image data is read out.

Next, the operation in this embodiment of the present invention for weather information display processing will be explained with reference to FIGS. 4 through 6. In this embodiment of the present invention, it is possible to scroll a map upon which the weather information is displayed.

Figure 4:
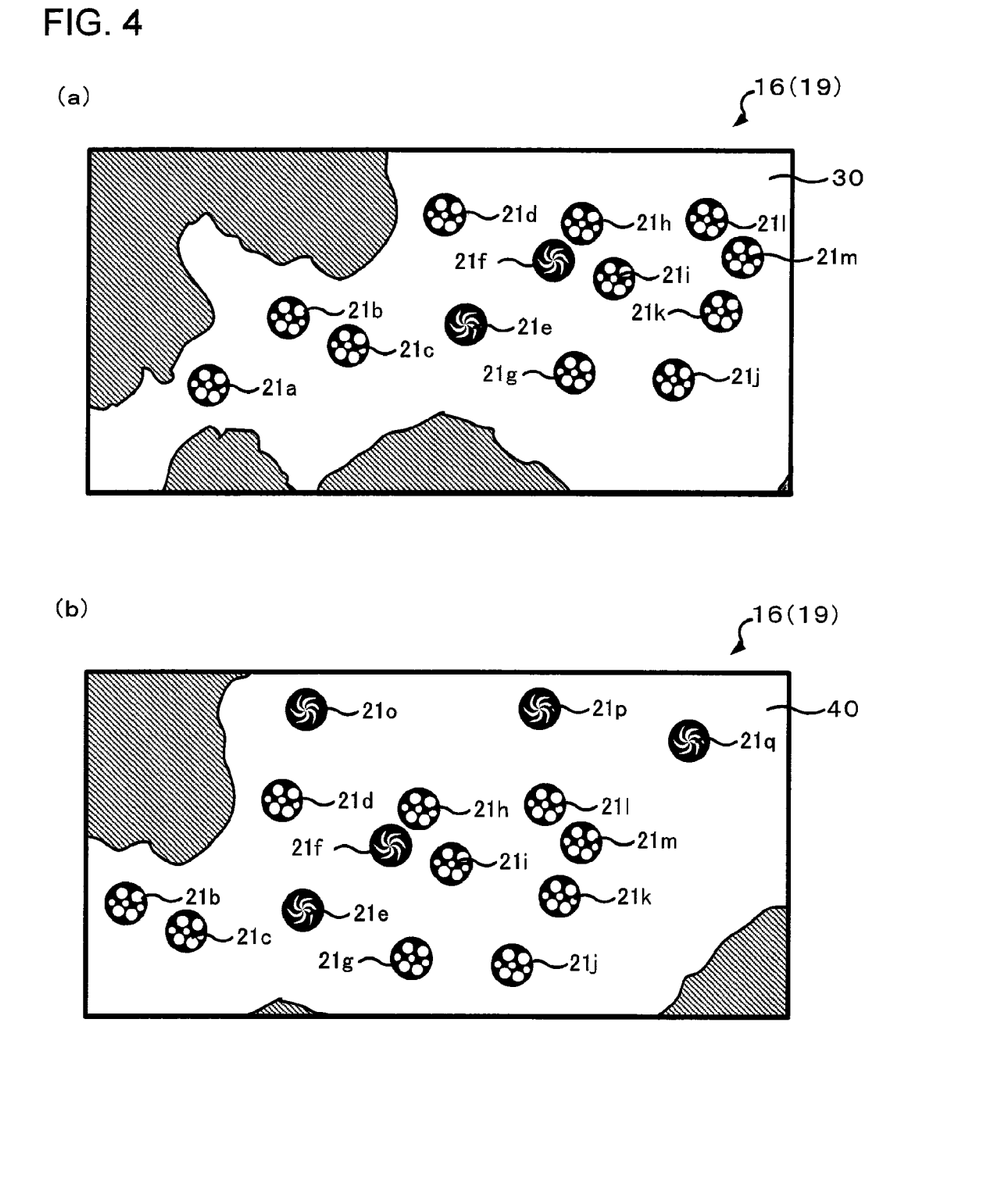
FIG. 4 is a figure for explanation of a weather information display map before scrolling and after scrolling.
Figure 5:
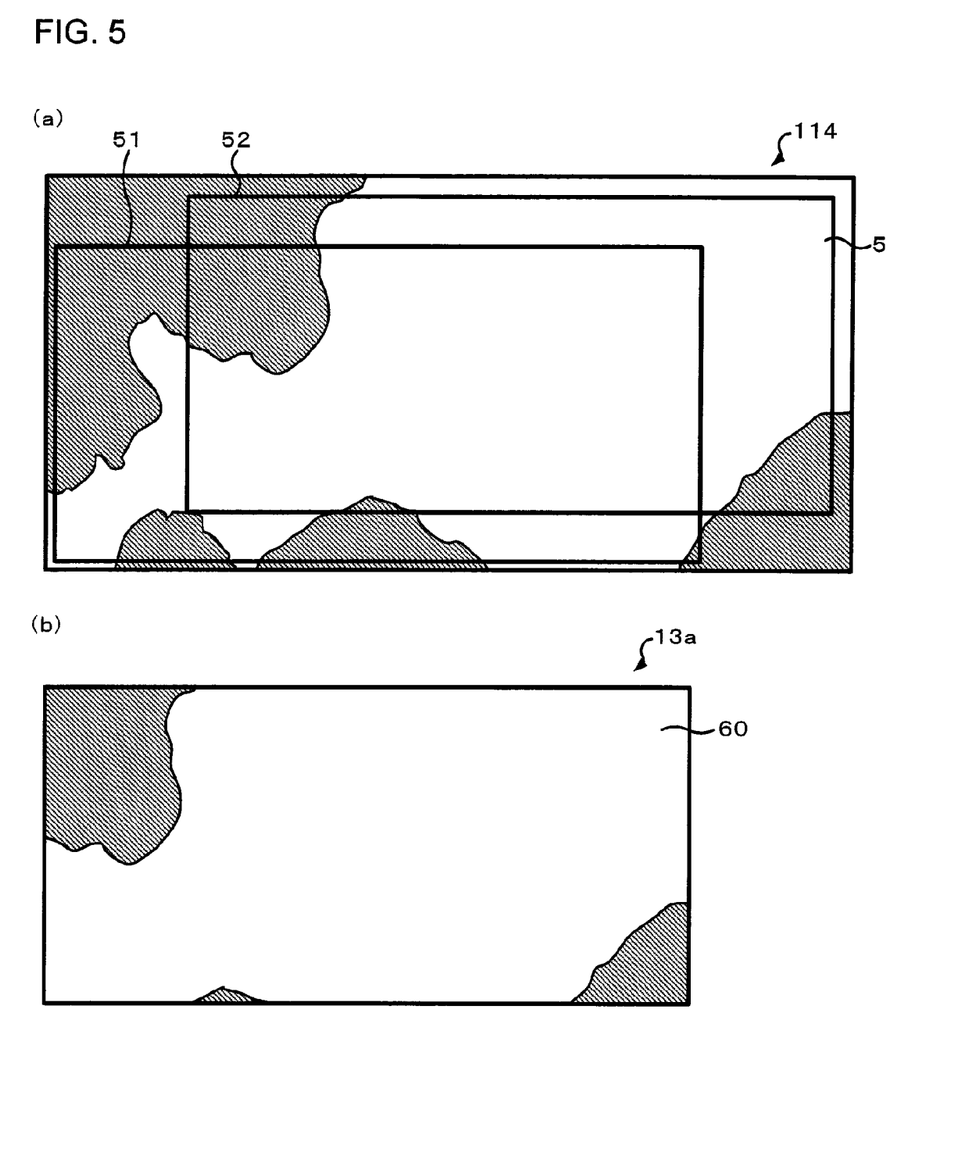
FIG. 5 is a figure for explanation of the display range of the weather information display map that is displayed after scrolling.

FIG. 4(*a*) is a figure for explanation of the map 30 that is displayed before the weather information is scrolled. In the following, a map upon which weather information is displayed will be termed a "weather information display map". Moreover, a map upon which weather information is not displayed will simply be termed a "map". And it is supposed that the weather information display map 30 is shown with north at the top. As shown in FIG. 4(*a*), icons 21a through 21m that denote weather information are displayed upon the weather information display map 30 before scrolling. The icons 21a through 21d and 21g through 21m are ones that denote hailstorms or hail. And the icons 21e and 21f are ones that denote whirlwinds.

And FIG. 4(*b*) is a figure for explanation of a weather information display map 40 that is displayed after the weather information display map 30 has been scrolled in the northward direction. As shown in FIG. 4(*b*), icons 21b through 21q that denote weather information are displayed upon the weather information display map 40 after scrolling. The icons 21b through 21d and 21g through 21m are ones that denote hailstorms or hail. And the icons 21e, 21f, and 21o through 21q are ones that denote whirlwinds.

The weather information display processing that is performed when the weather information display map 30 is scrolled and the weather information display map 40 is displayed upon the display monitor 16 will now be explained with reference to FIGS. 5 and 6. FIG. 5(*a*) schematically shows map data 50 stored upon the DVD-ROM 114 displayed in the form of a map. The range 51 shows the display range 51 of the map data on the weather information display map 30 before scrolling. Before scrolling, a map is drawn in the map drawing memory 13a on the basis of the map data for this display range 51. When a command is issued by operation of the input device 18 for scrolling of this weather information display map 30 in the north-east direction, the display range of the map data is shifted to a display range 52, which is in the north-east direction from the previous display range 51. And, as shown in FIG. 5(*b*), the control circuit 11 draws a map 60 in the map drawing memory 13a on the basis of the map data for this new display range 52.

The weather information that is used for weather information display upon this weather information display map 30 is the weather information in the areas 21C and 21D of FIG. 2. With the weather information processing according to this embodiment of the present invention, weather information image data for displaying weather information overlaid upon the maps that correspond to the areas 21C and 21D is created in advance by the control circuit 11 from the weather information for the areas 21C and 21D, and is stored in the map drawing memory 13a.

This weather information image data is created on the basis of the scale of the map being displayed upon the display monitor 16. Accordingly, when the scale of the map changes, the weather information image data is created again, and is again stored in the map drawing memory 13a.

If the display range of the weather information map when scrolled, or the display range of the weather information map after scrolling, is included in the area 21C or the area 21D, then image data is used just as it is for display of weather information upon the display monitor 16. On the other hand, if the display range of the weather information map when scrolled, or the display range of the weather information map after scrolling, is not include in the area 21C or the area 21D, then the weather information for the area or areas in which the weather information map is included is extracted to create weather information image data again, and is stored in the map drawing memory 13a.

Figure 6:
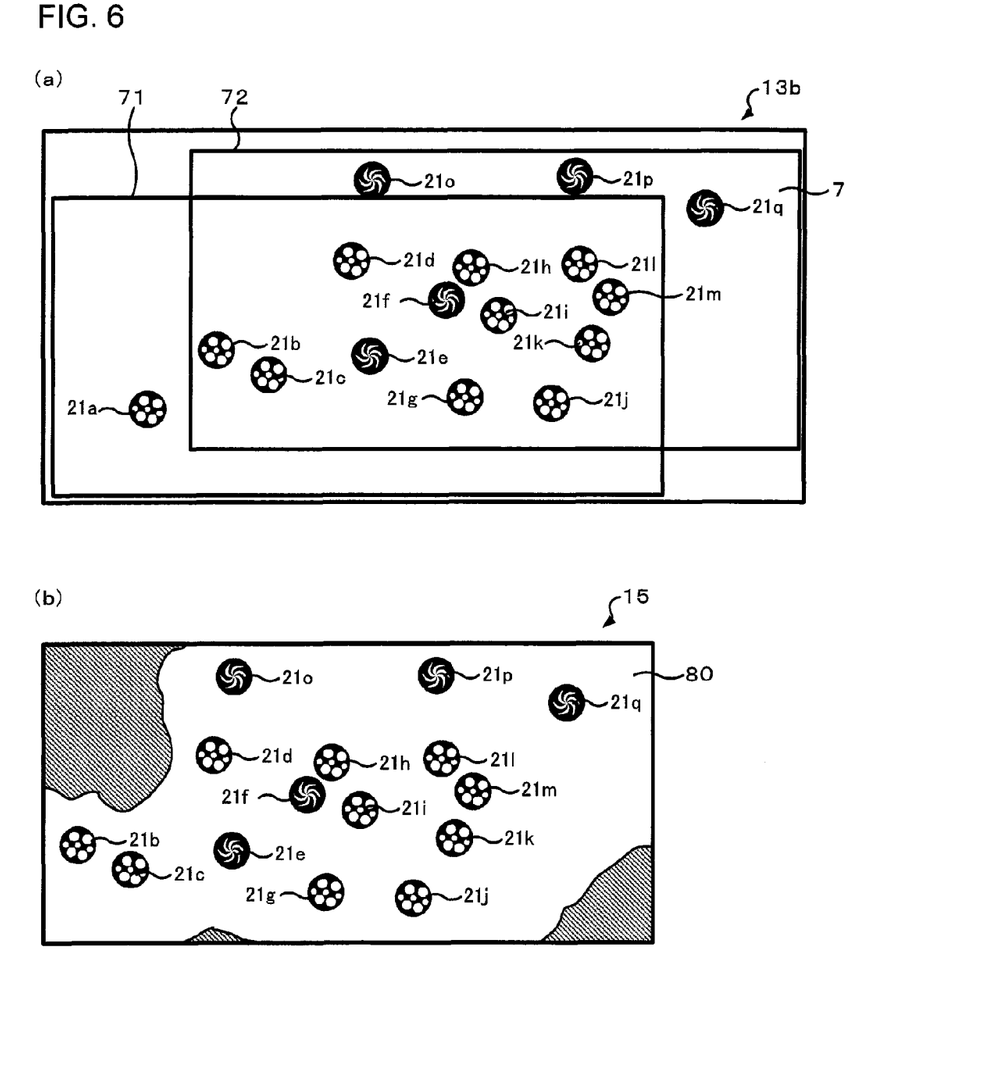
FIG. 6 is a figure for explanation of the display range of weather information that is displayed after scrolling.

FIG. 6(a) schematically shows the weather information image data for weather information that has been created, displayed in the form of a map.

The range 71 shows the display range 71 of the weather information image data for the weather information display map 30 before scrolling. Using the weather information image data for the display range 71, if weather information is overdrawn upon the map that is drawn on the basis of the map data for the display range 51 of FIG. 5 and this image data that has thus been overdrawn is displayed upon the display monitor 16, then the weather information display map 30 of FIG. 3(a) is displayed.

When, by operation of the input device 18, a command is issued for scrolling of the weather information display map 30 in the north-east direction, then the display range for the weather information image data is shifted from the display range 71 to a display range 72. And, as shown in FIG. 6(b), image data 80 for the weather information display map 40 is created using the weather information image data for the display range 72, by overdrawing this weather information over the map 60 that has been drawn in the map drawing memory 13a. This image data 80 is stored in the image memory 15. And the weather information display map 40 is displayed by displaying the image data 80 stored in the image memory 15 upon the display monitor 16.

Figure 7:
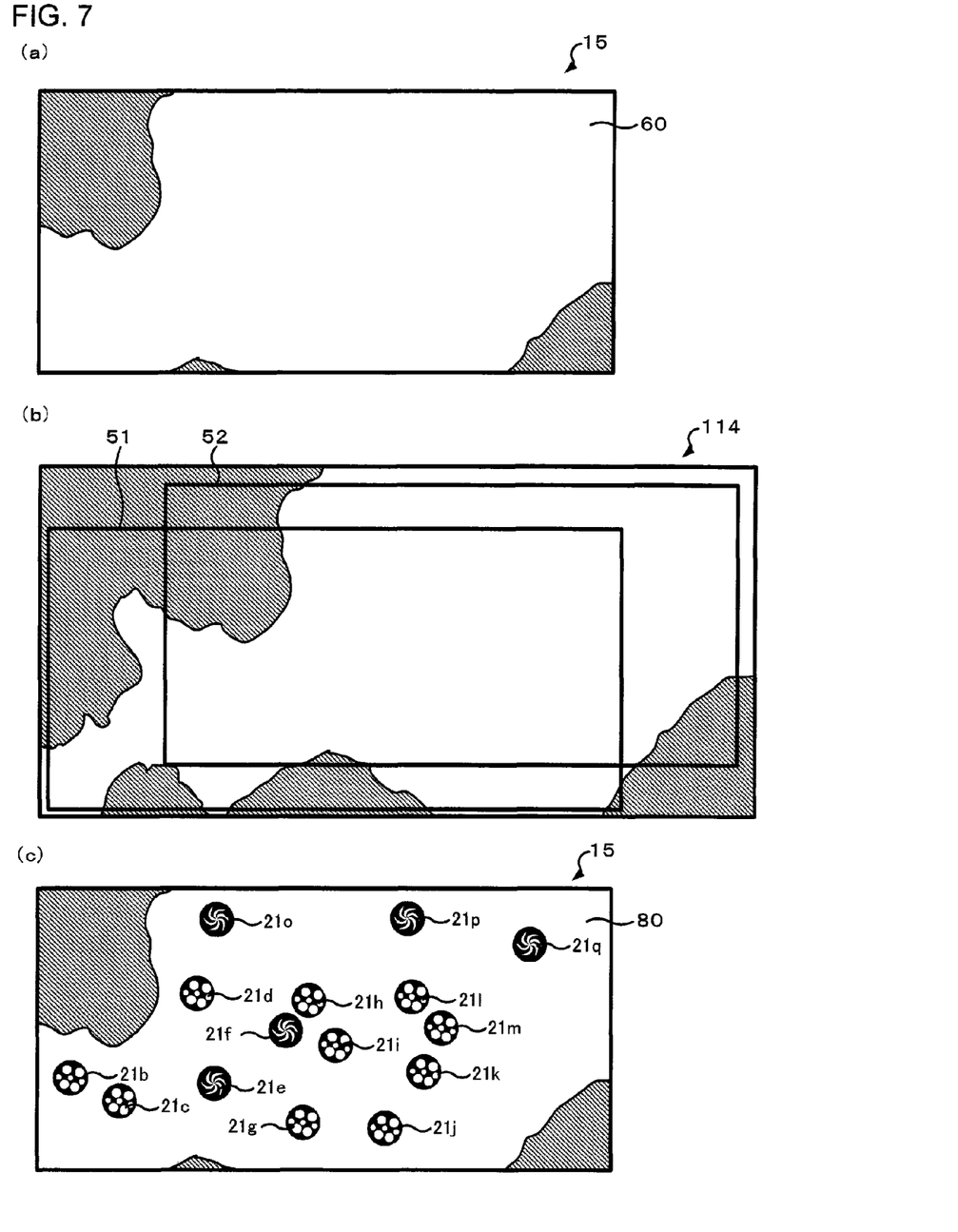
FIG. 7 is a figure for explanation of prior art display processing for a weather information display map.

According to weather information display processing according to the prior art, the weather information display map 40 would be displayed upon the display monitor 16 by the following procedure. As shown in FIG. 7(a), the control circuit 11 would draw the map 60 after scrolling in the image memory 15 on the basis of the map data for the display range 52 shown in FIG. 7(b). And, on the basis of the map data for the display range 52, weather information corresponding to this display range 52 would be extracted from the weather information stored in the reception memory 112. Then, as shown in FIG. 7(c), image data for displaying weather information would be created on the basis of this weather information that has been extracted, and weather information 21b through 21q would be drawn as overlaid over the map 60 shown in FIG. 7(a). The weather information display map 40 would be displayed by displaying the image data 80 that would thus have been drawn upon the display monitor 16.

Sometimes in this prior art case it could happen that the weather information might not be displayed during scrolling or that the weather information might not be displayed immediately after scrolling, because the time period for performing processing to extract the weather information corresponding to the display range 52 from the weather information stored in the reception memory 112, and the time period for performing processing to create image data for displaying weather information on the basis of this extracted weather information, would be long.

Figure 8:
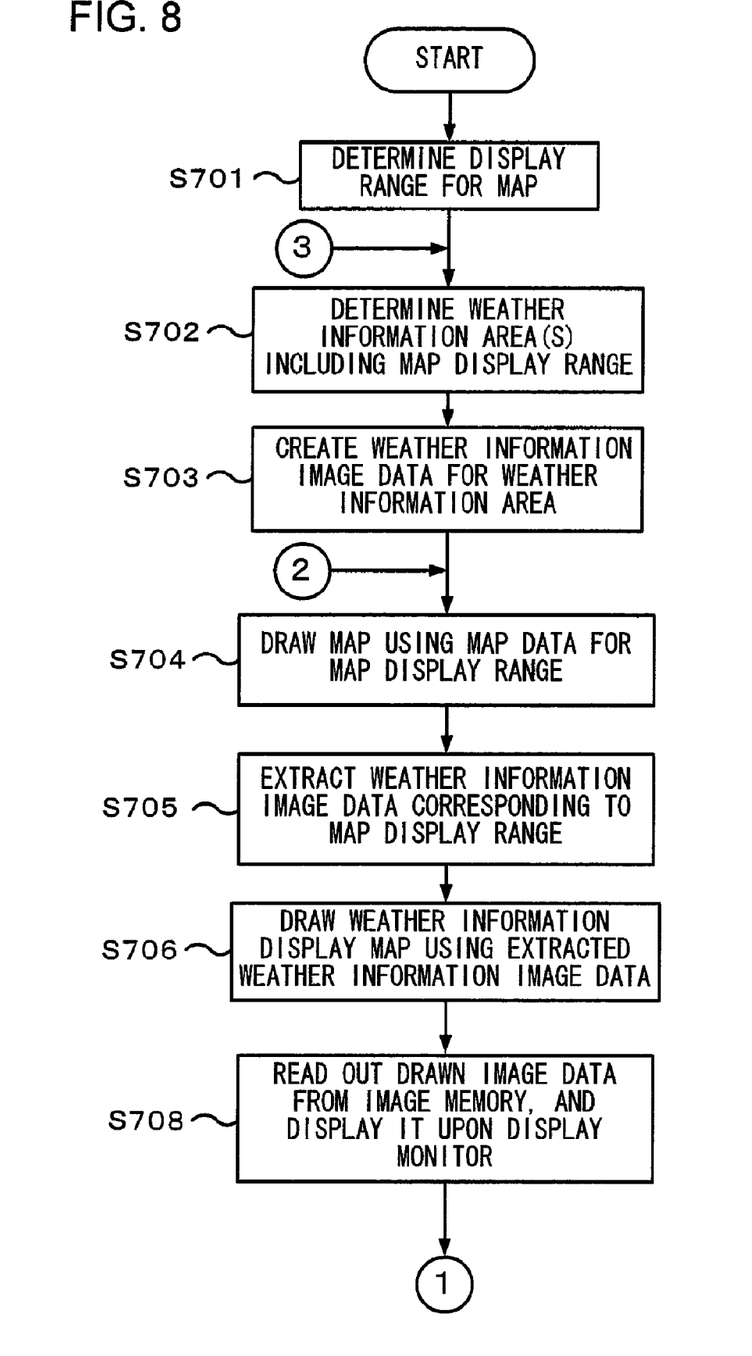
FIG. 8 is a flow chart for explanation of weather information display processing, according to this embodiment of the present invention.

Next, the weather information display processing according to this embodiment of the present invention will be explained with reference to the flow charts of FIGS. 8 and 9. When weather information display is selected upon a menu not shown in the figures, the processing of FIGS. 8 and 9 is executed by the control circuit 11 starting a program.

In a step S701, the display range for the map is determined. In a step S702, the area or areas of weather information containing this map display range are determined. In a step S703, weather information image data for this determined area of weather information is created. This created weather information image data is stored in the weather information drawing memory 13b. In a step S704, a map is drawn in the map drawing memory 13a using the map data corresponding to the display range for the map. In a step S705, weather information image data corresponding to the map display range is extracted. In a step S706, using this extracted weather information image data, weather information is overdrawn as overlaid upon the map that was drawn in the map drawing memory 13a. This image data that has been drawn is stored in the image memory 15. In a step S707, this image data in which the weather information is overlaid upon the map is read out from the image memory 15, so as to display a weather information display map upon the display monitor 16.

Figure 9:
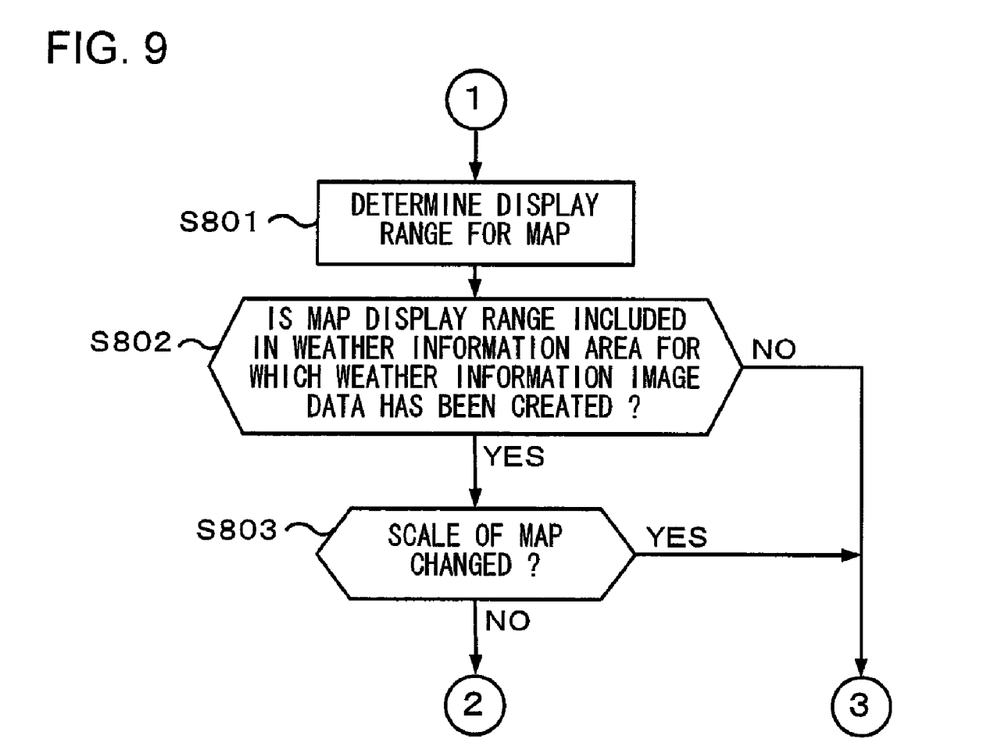
FIG. 9 is another flow chart for explanation of weather information display processing according to this embodiment of the present invention.

In a step S801 of FIG. 9, the display range for the map is determined. In a step S802, a decision is made as to whether or not this display range for the map is included in the weather information area for which weather information image data has been created. If the display range for the map is included in the weather information area for which weather information image data has been created, then an affirmative decision is reached in this step S802, and the flow of control proceeds to a step S803. But, if the display range for the map is not included in the weather information area for which weather information image data has been created, then a negative decision is reached in this step S802, and the flow of control returns to the step S702 of the FIG. 8 flow chart. In this case, weather information image data is newly created, and weather information is drawn by being overlaid upon the map, using this newly created weather information image data. In the step S803, a decision is made as to whether or not the scale of the map being displayed upon the display monitor 16 has been changed. If the scale of the map being displayed upon the display monitor 16 has indeed been changed, then an affirmative decision is reached in this step S803, and the flow of control returns to the step S702 of the FIG. 8 flow chart. But if the scale of the map being displayed upon the display monitor 16 has not been changed, then a negative decision is reached in this step S803, and the flow of control returns to the step S704 of the FIG. 8 flow chart. In this case, weather information is drawn by being overlaid upon the map, using the weather information image data that was previously created.

The navigation device 1 according to the embodiment of the present invention described above provides the following operational benefit.

Since it is arranged to create the weather information image data 70 for displaying the weather information before the map is scrolled, and, when the map is scrolled, to display the weather information as overlaid upon the map by using this weather information image data 70, accordingly it becomes unnecessary to extract weather information stored in the reception memory 112 and to create image data for displaying this extracted weather information upon the map, each time the map is scrolled; and therefore it is possible to display the weather information superimposed upon the map during scrolling, and to display the weather information superimposed upon the map immediately after scrolling has been completed.

The above embodiment may be varied in the following ways.

-Variant Embodiment #1-

Figure 10:
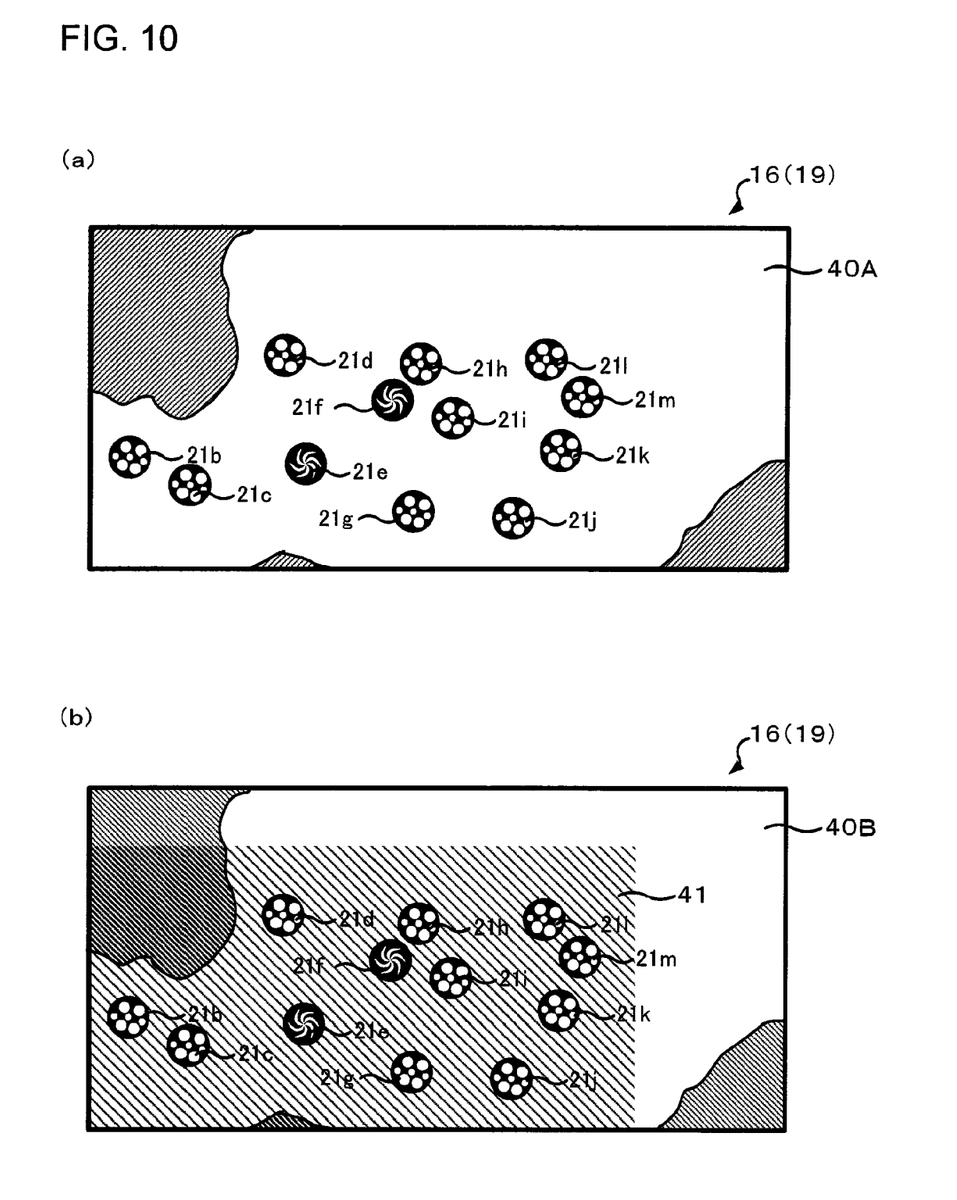
FIG. 10 is a figure for explanation of a weather information display map that has been displayed and scrolled using weather information image data employed in the weather information display map before scrolling.

It would also be possible to arrange for a weather information display map 40A after scrolling to be displayed, not using the weather information image data for the display range 72 after scrolling, but rather using the weather information image data for the display range 71 before scrolling, as shown in FIG. 10(a). In this case it is no longer necessary to extract the weather information image data for the display range 72 from among all the weather information image data, so that the time period required for the weather information display processing becomes yet shorter. Since the icons 21o through 21q are not included in the weather information image data for the display range 71 before scrolling, these icons 21o through 21q are not displayed upon the weather information display map 40A after scrolling. This procedure is particularly effective when the distance through which the weather information display map has been moved by the scrolling process is short, since, in this case, the weather information image data for the display range 71 before scrolling and the weather information image data for the display range 72 after scrolling do not greatly differ.

Furthermore, in this case, in order to make it clear whether the icons 21o through 21q are not being displayed because there is no weather information, or whether the icons 21o through 21q are not being displayed because there is no weather information image data, it would also be possible to arrange for the range 41 of the extracted weather information image data to be displayed on the weather information display map 40B with the display mode being changed, as shown in FIG. 10(b). On the weather information display map 40B shown in FIG. 10(b), the display color of the map is made to be different within the range 41 of the extracted weather information image data, and within the range outside thereof.

-Variant Embodiment #2-

It would also be possible to arrange either to display the weather information after scrolling by using the weather information image data created in advance, or to display the weather information after scrolling by creating image data by extracting weather information for the display range of the map after scrolling, in dependence upon the scale of the weather information display map. The reason for doing this is that, since the number of areas 21A through 21L of weather information to be extracted becomes large if the scale of the map is less than a predetermined value (this is the case of a wide area map), accordingly the time period needed for performing the processing to extract weather information corresponding to the display range of the map from the weather information stored in the reception memory 112, and the time period needed for performing the processing to create image data for displaying weather information on the basis of this extracted weather information, become long. On the other hand, since the number of areas 21A through 21L of weather information to be extracted becomes relatively small if the scale of the map is greater than or equal to the predetermined value (this is the case of a detailed map), accordingly the time period needed for performing the processing to extract weather information corresponding to the display range of the map from the weather information stored in the reception memory 112, and the time period needed for performing the processing to create image data for displaying weather information on the basis of this extracted weather information, do not become particularly long.

-Variant Embodiment #3-

Figure 11:
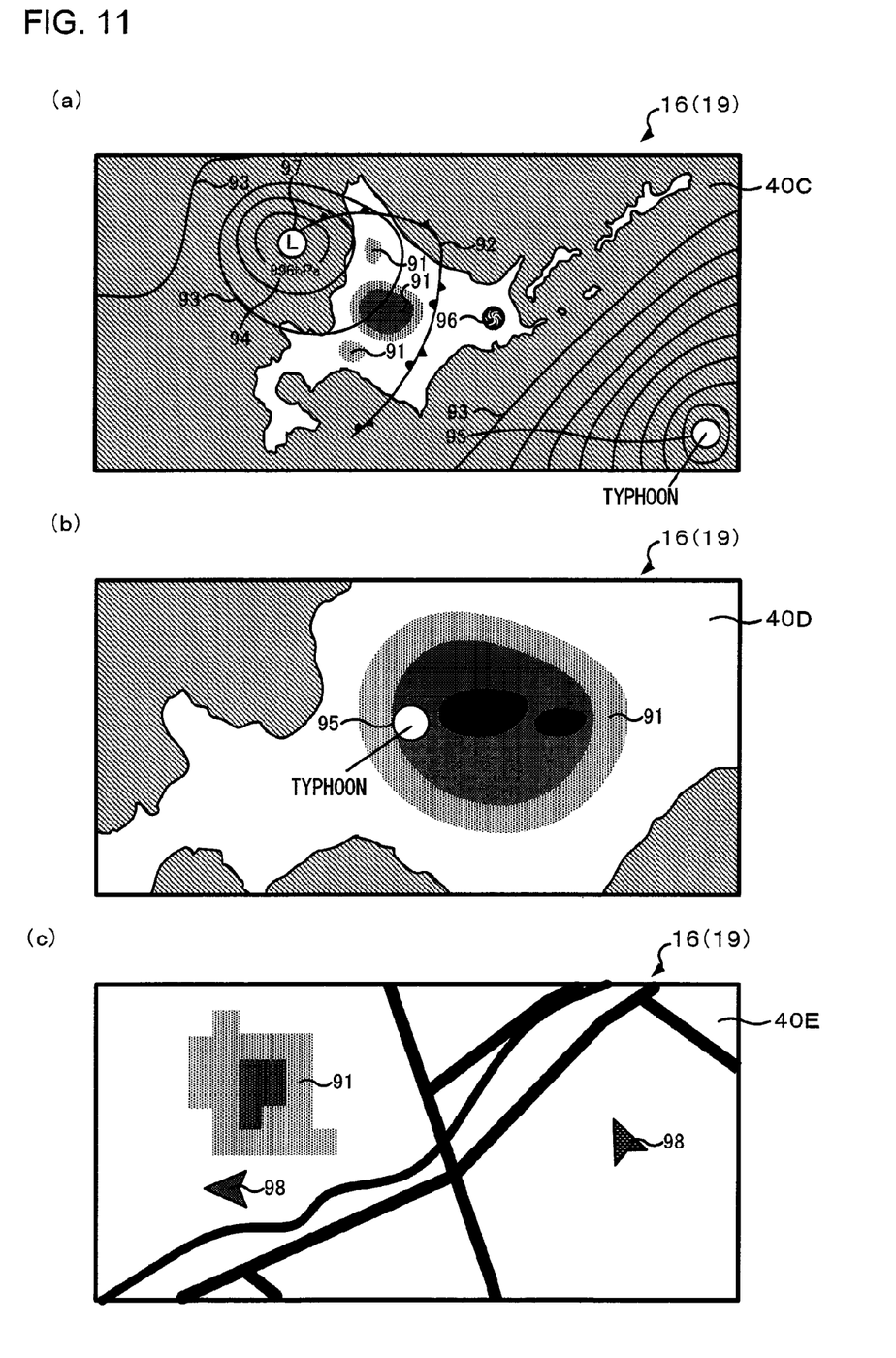
FIG. 11 is a figure for explanation of weather information display maps in which the classes of weather information that are displayed in those weather information display maps have been changed in dependence upon the weather information display map scale.

It would also be possible to arrange to change the classes of weather information displayed upon the weather information display map according to the scale of the weather information display map. For example, if the scale of the weather information display map is small, then rainfall distribution 91 as measured by precipitation radar, cold and warm fronts 92, isobars 93, barometric pressure 94, typhoons 95, whirlwinds 96, and high and low pressure areas 97 may be displayed as the weather information, as in the case of the weather information display map 40C shown in FIG. 11(a). And, if the scale of the weather information display map is medium, then only rainfall distribution 91 as measured by precipitation radar and typhoons 95 may be displayed as the weather information, as in the case of the weather information display map 40D shown in FIG. 11(b). Moreover, if the scale of the weather information display map is large, then only rainfall distribution 91 as measured by precipitation radar and wind speeds and directions 98 may be displayed as the weather information, as in the case of the weather information display map 40E shown in FIG. 11(c). By doing this, it is possible to display appropriate weather information for each scale of the weather map.

-Variant Embodiment #4-

Figure 12:
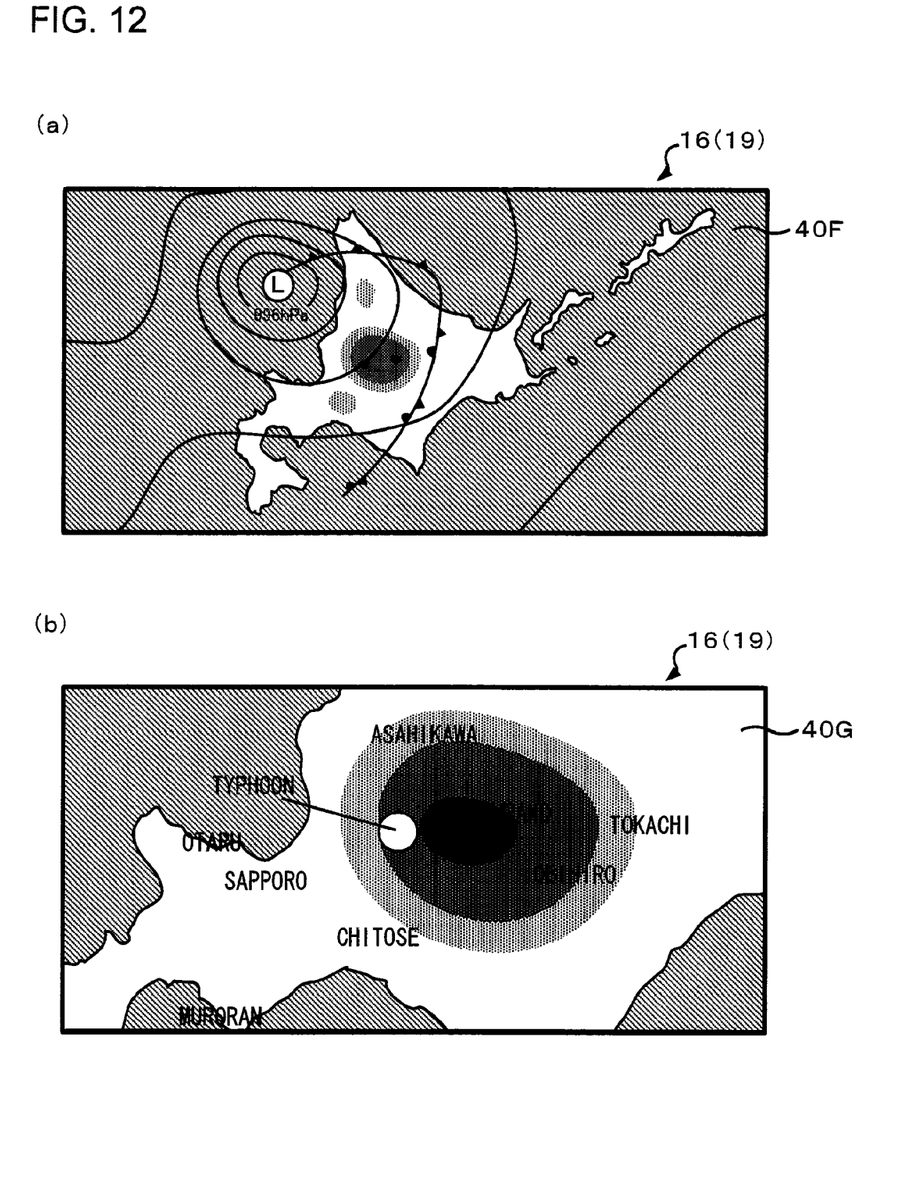
FIG. 12 is a figure for explanation of weather information display maps in which place names are displayed, or are not displayed, upon those weather information display maps in dependence upon the weather information display map scale.

It would also be possible to arrange either to display place names on the weather information display map or not, according to the scale of the weather information display map. For example, place names may not be displayed upon a weather information display map 40F if the scale of that weather information display map 40F is less than a predetermined value, as shown in FIG. 12(a). On the other hand, as shown in FIG. 12(b), if the scale of a weather information display map 40G is greater than or equal to the predetermined value, then this weather information display map 40G may be displayed with place names shown upon it. By doing this, when the user wishes to know general weather information, he is able to apprehend that weather information without being impeded by the display of place names, whereas, when he wishes to know the details of weather information over a narrow area, he is able to recognize the positions at which the weather information is being displayed in an accurate manner due to the display of place names.

The above explanation is only an example, and the present invention is not to be considered as being limited in any way by the embodiments described above. For example, it would also be possible to apply the present invention to electronic information processing that is capable of displaying a map, but that is not endowed with any function of navigation.

The invention claimed is:

1. A map display device, comprising:
a map image data creation unit that creates map image data;
a map image data storage unit that stores the map image data created by the map image data creation unit;
a map display control unit that displays a map on the basis of the map image data upon a display monitor;
a map scroll unit that scrolls the map;
a weather information reception unit that receives weather information for a plurality of predetermined areas;
a weather information image data creation unit that creates weather information image data for displaying an icon corresponding to a specific weather on the basis of weather information for an area or areas in the predetermined areas received by the weather information reception unit, the area or areas covering over a display range of the map displayed upon the display monitor;

a weather information image data storage unit that stores the weather information image data created by the weather information image data creation unit; and a weather information display control unit that displays the icon on the basis of the weather information image data at a specific position upon the map; wherein the weather information display control unit displays the icon at the specific position upon the map after scrolling, using the weather information image data stored by the weather information image data storage unit before the map is scrolled.

2. A map display device according to claim 1, wherein:
the weather information display control unit reads in the weather information image data for displaying the icon at the specific position within the display range of the map displayed upon the display monitor by synchronizing timing of reading in the map image data stored in the map image data storage unit and timing of reading in the weather information image data stored in the weather information image data storage unit, and displays the icon at the specific position upon the map by using this weather information image data that has been read in.

3. A map display device according to claim 1, wherein:
if the specific position at which the icon is to be displayed upon the map after scrolling is inside of the display range of the map before scrolling, the weather information display control unit displays the icon; and if the specific position at which the icon is to be displayed upon the map after scrolling is outside of the display range of the map before scrolling, the weather information display control unit does not display the icon.

4. A map display device according to claim 3, wherein the map display control unit displays a map region in the map after scrolling being outside of the display range of the map before scrolling with a different display mode from other regions.

5. A map display device according to claim 1, wherein:
if the scale of the map being displayed on the display monitor is less than a predetermined value, the weather information display control unit displays the icon at the specific position upon the map after scrolling, using the weather information image data that is created by the weather information image data creation unit and stored by the weather information image data storage unit before the map is scrolled; and if the scale of the map being displayed on the display monitor is greater than or equal to the predetermined value, the weather information image data creation unit extracts weather information corresponding to the display range of the map after scrolling from the weather information received by the weather information reception unit and then creates the weather information image data for displaying the icon on the basis of the extracted weather information, and the weather information display control unit displays the icon at the specific position upon the map after scrolling, using the weather information image data created by the weather information image data creation unit.

6. A map display device according to claim 1, wherein the weather information display control unit changes the classes of weather information, for which the icon is displayed on the basis of the scale of the map.

7. A map display device according to claim 1, wherein the map display control unit:
displays no place names upon the map displayed upon the display monitor if the scale of the map is less than a predetermined value, and displays place names upon the map displayed upon the display monitor if the scale of the map is greater than or equal to the predetermined value.

* * * * *